Oct. 27, 1936.                C. A. NICKLE                2,059,017
                      SCREEN FILTERING ARRANGEMENT
                         Filed Dec. 27, 1933
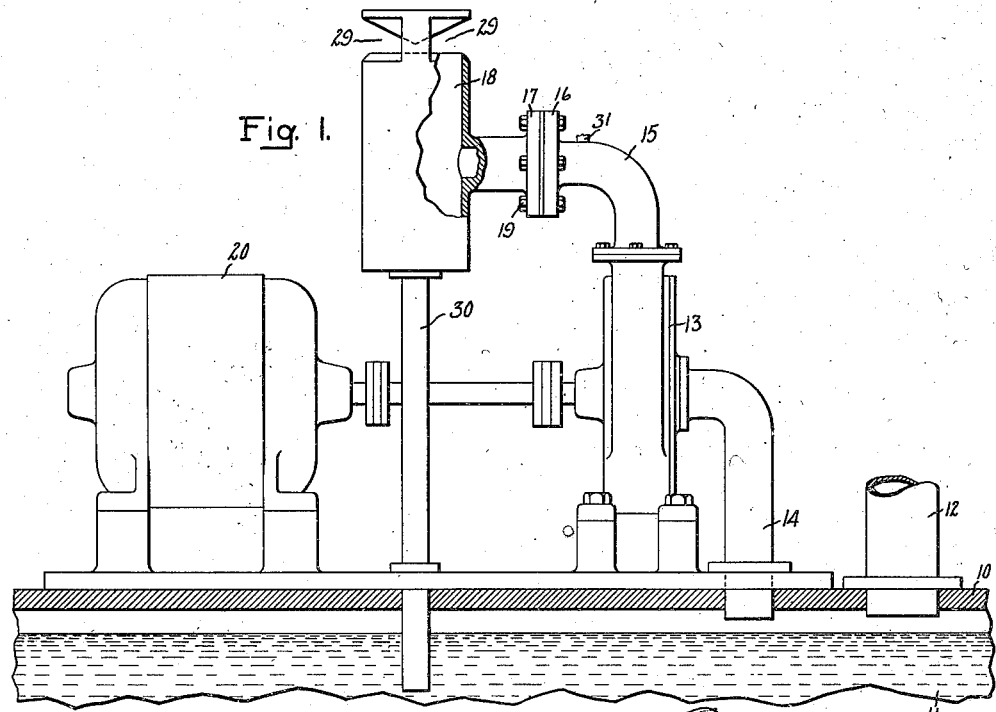
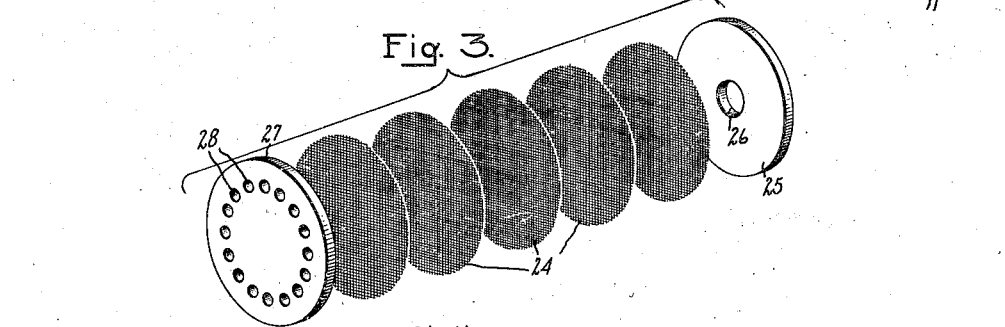
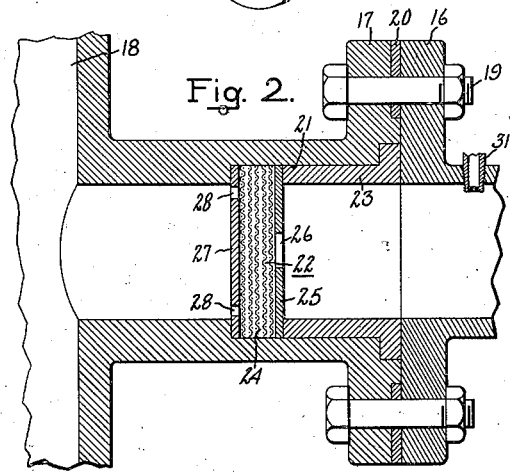
Inventor:
Clifford A. Nickle,
by Harry E. Dunham
His Attorney.

Patented Oct. 27, 1936

2,059,017

UNITED STATES PATENT OFFICE 2,059,017

SCREEN FILTERING ARRANGEMENT

Clifford A. Nickle, Schenectady, N. Y., assignor to General Electric Company, a corporation of New York Application December 27, 1933, Serial No. 704,107

3 Claims. (Cl. 183—34)

The present invention relates to screen filtering arrangements comprising a filter with a plurality of screens made of wire mesh or the like for filtering gases, that is, for removing vapor or dust therefrom.

One object of my invention is to provide an improved method for filtering gases by means of a screen filter whereby liquid and solid substances carried along with the gases are readily and effectively removed therefrom.

Another object of my invention is to provide an improved apparatus for carrying out the method.

For a consideration of what I believe to be novel and my invention, attention is directed to the following description and the claims appended thereto in connection with the accompanying drawing which forms a part of my specification.

In the drawing, Fig. 1 illustrates a filtering arrangement embodying my invention; Fig. 2 shows a part of Fig. 1 to an enlarged scale; and Fig. 3 shows the screen filter proper with its parts separated.

In accordance with the method of filtering a gas by means of a screen filter according to my invention, such gas is forced into the filter at a velocity sufficient to produce turbulence therein. By the expression "filtering a gas" I mean separating the gas from its impurities, which impurities may be in the form of liquid or dust. The forcing of the gas into the filter at a velocity sufficient to produce turbulence within the filter is an important feature of my invention. By "turbulence" I mean a violent disturbance in the flow within the filter sufficient to cause impurities such as liquid and solid particles contained in the gas to strike a portion or portions of the filter. I have found that only in this way is the filter capable of retaining or separating impurities of the above kind contained in the gas. One explanation of the result attained is that the impurities contained in the gas strike parts of the screens, due to the turbulent movement in the filter and adhere thereto, whence they may be drained.

As regards the removal of solid particles in the form of dust from a gas, the result is considerably improved by wetting these particles. This is accomplished in accordance with another step of my invention which comprises passing the gas to be filtered through a fine spray of liquid or vapor, such as water, before the gas is forced into the screen filter.

In cases where ordinary screens made of wire mesh are not wetted by entrained liquids or fog, such as mercury liquid particles, contained in a gas, screen filters, such as filters made of specially treated platinum-plated wire mesh, are used.

In the drawing I have shown an arrangement for carrying out the method according to my invention, more specifically a screen filtering arrangement for removing oil particles from air. Such arrangement may be used in connection with bearings, through which the oil for lubricating and cooling the bearings, is circulated from a tank and returned thereto. The oil is returned to the tank in the form of a stream of liquid and oil particles of fog mixed with air. To prevent oil particles from passing into the atmosphere and settling on various apparatus used in power plants as well as on the walls of the plant, it is necessary to remove the entrained oil from the air or other gases before such gases are discharged into the atmosphere. This is accomplished by passing the oil entrained in and the air flowing into the tank through a screen filtering arrangement according to my invention.

The screen filtering arrangement comprises a tank 10 containing oil 11 and being connected to a conduit 12 through which a stream of oil, together with a mixture of a gas such as air and oil vapor, is passed into the tank. The gas together with the oil vapor fill the upper space of the tank. This mixture is removed from the gas or vapor space by means of a blower or compressor 13 having an inlet 14 connected to the tank and an outlet 15 having a flanged portion 16 connected to a flanged portion 17 of a chamber 18. The flanges are held together by means of bolts 19 and leakage is prevented by a packing 20 between the two flanges. The flanged portion 17 of the chamber 18 has a recess 21 (Fig. 2) for accommodating a screen filter 22 held in position by means of a flanged sleeve 23. The screen filter in its preferred form comprises a plurality of screens of wire mesh 24 adjacent each other, an inlet plate 25 having a central opening 26, and an outlet or discharge plate 27 having a ring of openings 28 near its circumference. I have found that fifteen screens of two inch diameter and two-hundred mesh, closely packed together, gave good results in eliminating oil entrained from air. The chamber 18 has an upper portion provided with openings 29 for discharging gas, such as air, and a base portion connected to the tank 10 by a conduit 30 for conducting the oil removed from the gas into the tank. The conduit 30 projects into the tank below the oil level to insure proper circulation through the filtering apparatus.

The operation of the arrangement is as follows: The mixture of air and oil vapor contained in the upper space of the tank is forcibly removed therefrom by the blower 13 and passed into the screen filter 22 at a velocity sufficient to produce turbulence within the filter. The fine particles of oil, due to the turbulent movement within the filter, accumulate on the wire mesh whence they flow down into the lower part of the filter and out through the lower openings 28 of the discharge plate 27 into the chamber 18, whence they are returned to the tank, the air flowing through the opening 28 being discharged through the openings 29 of the chamber 18 into the atmosphere.

As the arrangement is based on the theory that impurities contained in the gas are retained within the filter by adhesion with the screens, it is important that the adhesion between the impurities and the filter is great enough to make them stick and accumulate on the filter. With regard to gases containing impurities in solid form, such as dust, this is accomplished by passing the gas through a spray of liquid before it is passed into the screen filter. To this end a nozzle or nozzles 31 are provided ahead of the filter for producing a fine spray of liquid or vapor ahead of the filter. The gas to be filtered is passed through this spray whereby the solid impurities contained in the gas are at least partly wetted. The liquid also wets the screens and thereby increases the adhesion between the particles and the wire mesh of the filter. The impurities may be removed or drained from the filter by passing a sufficient amount of liquid into the filter or by taking the filter apart.

As pointed out above, an important feature of my invention is that the gas to be filtered be forced into the screen filter with a velocity great enough to produce turbulence therein. This velocity, however, should not be sufficient to cause the substance deposited on the screen to re-atomize. There are no critical values as to the number of screens and the size of their mesh. Successful operation has been effected with a comparatively wide variation in these factors. Also, the velocity of the gas forced into the filter may vary to a certain extent. The maintaining of a high velocity of the gas forced into the filter permits the filtering of a considerable amount of gas with a comparatively small filter. The filter has been successfully used for filtering such substances as carbon dust, chromium oxide powder and the dense white substance from burning magnesium. In these cases a fine water spray was introduced into the air system just before the stream of air reached the filter. The water vapor deposits on the screen in the normal way and in addition traps the solid particles which drain off with it.

The removal of impurities from gases is so complete that the invention has been found satisfactory for indicating the amount of impurities of the above mentioned kind contained in a gas.

With the operation of my improved arrangement in accordance with the method of my invention I have in fact found it impossible to pass the dense white clouds of the products of burning magnesium through the filter.

What I claim as new and desire to secure by Letters Patent of the United States, is:—

1. The combination of an oil tank, a conduit for conducting gas containing oil vapor into the tank, a blower having an inlet communicating with the gas space in the tank, a filter comprising a plurality of screens of wire mesh connected to the discharge of the blower for separating the oil from the gas, and a conduit for conducting the filtered oil into the tank, said blower being operated at a speed to force the gas into the screen filter at a velocity sufficient to produce turbulence therein.

2. The combination of an oil tank, a conduit for conducting gas and entrained oil into the tank, a blower having an inlet communicating with the gas space in the tank, a filter comprising a plurality of screens of wire mesh connected to the discharge of the blower for separating the entrained oil from the gas, and a conduit for conducting the separated oil into the tank.

3. An arrangement for filtering gas containing liquid and solid impurities comprising a container, a conduit for conducting gas to be filtered to the container, a screen filter, pump means connected to the container and the inlet of the filter for forcing gas from the container through the filter, and means for discharging impurities from the filter into the container.

CLIFFORD A. NICKLE.